June 14, 1949.　　　　　　　　　D. BLITZ　　　　　　　　　2,472,785
STANDING WAVE DETECTOR AND INDICATOR SYSTEM
Filed Sept. 14, 1946　　　　　　　　　　　　　　　　2 Sheets-Sheet 1
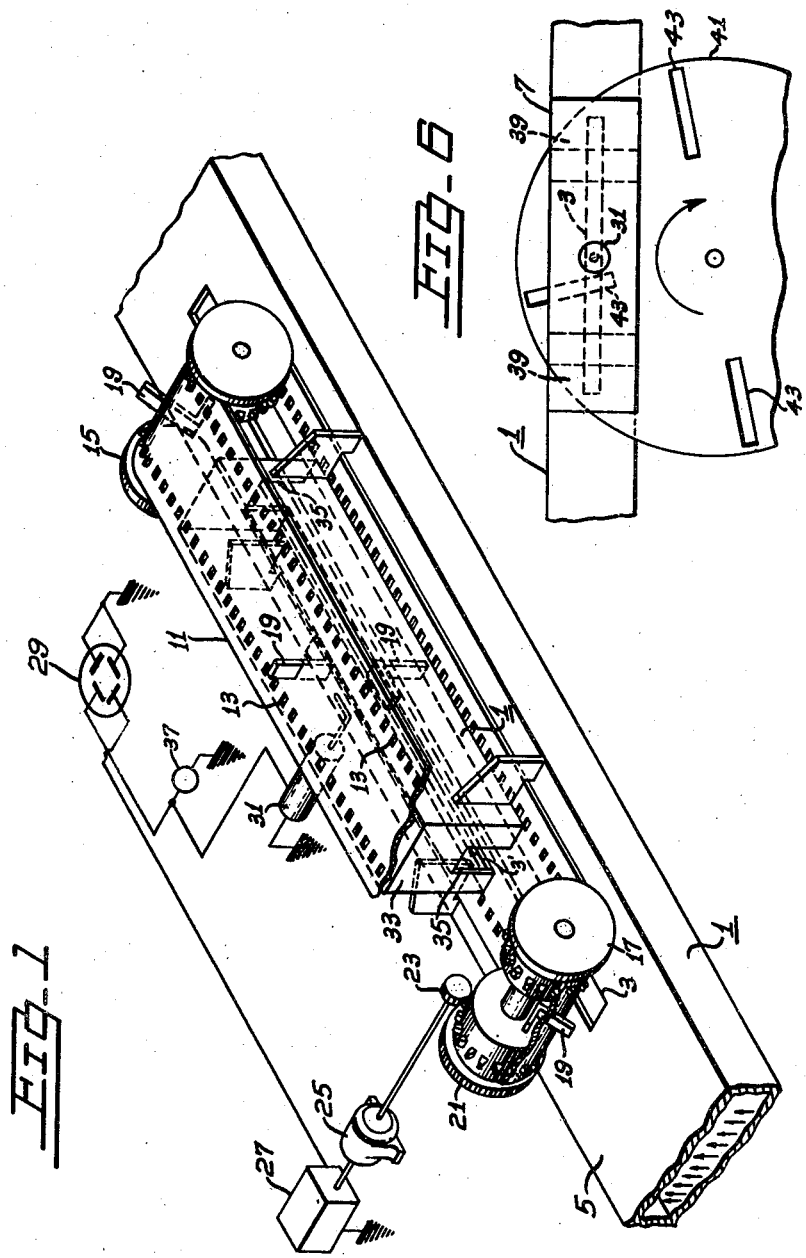
Inventor
*Daniel Blitz*
Attorney

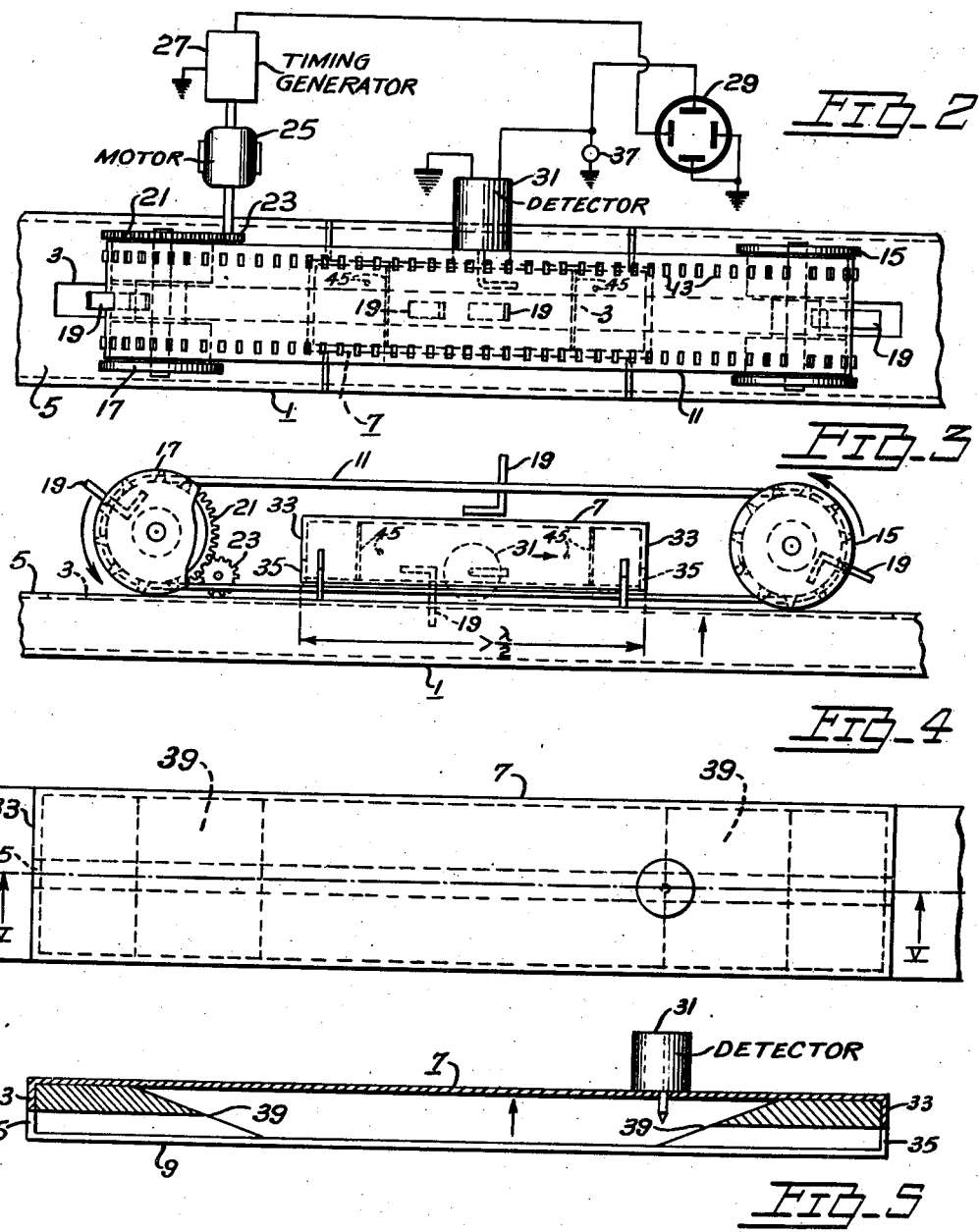

Patented June 14, 1949

2,472,785

UNITED STATES PATENT OFFICE 2,472,785

STANDING WAVE DETECTOR AND INDICATOR SYSTEM

Daniel Blitz, Newtonville, Mass., assignor to Radio Corporation of America, a corporation of Delaware Application September 14, 1946, Serial No. 697,131

11 Claims. (Cl. 171—95)

This invention relates generally to microwave apparatus and more particularly to improved methods of and means for detecting and indicating standing wave characteristics in waveguide transmission systems.

Heretofore various types of movable wave probe elements have been employed for detecting the standing wave characteristics of waveguide transmission systems. The accuracy of such movable probe devices is dependent upon uniformity of contact between the movable probe element and the waveguide walls. Erratic contact effects at microwave frequencies are extremely troublesome and introduce objectionable errors in such standing wave measurements. Furthermore, standing wave measurements obtained by such movable probe systems have required that a series of measurements be obtained at successive points along a section of the waveguide system and that the wave magnitude values be plotted against the probe positions in order to ascertain the standing wave distribution.

The instant invention comprises an improvement upon such prior art movable probe systems wherein a plurality of probes or other coupling elements carried by a continuously movable coupling support traverse and scan a space between coincidental slots in the transmission waveguide and in a detector waveguide coupled thereto. Since the coupling elements continuously and recurrently traverse the longitudinal slots in the coupled waveguides, a continuous indication may be provided upon an oscillograph coupled to a wave detector responsive to the coupled microwave energy. A timing voltage may be synchronized with the scanning rate of the movable coupling elements to provide a stationary pattern upon the oscillograph which is indicative of the distribution and magnitudes of the standing waves in the transmission waveguide system.

A first embodiment of the instant invention utilizes a continuous belt which carries a plurality of coupling elements at uniformly spaced points thereon, the coupling elements successively traversing the slots between the transmission waveguide and the detector waveguide. The motor driving the belt sprockets also drives a timing wave generator which is coupled to the horizontal deflecting elements of a cathode ray oscilloscope. The output of the wave detector coupled into the detector waveguide is connected to the vertical deflecting elements of the oscilloscope. Thus a stationary pattern of the standing wave magnitude and distribution in the transmission waveguide is provided on the oscilloscope.

A modification of the invention comprises a rotating disc having a plurality of radial coupling slots therein wherein the disc rotates between the longitudinal slots in the transmission waveguide and detector waveguide. The several slots in the rotating disc continuously and successively scan the space between the coupling slots of the waveguides. The indicator system may be similar to that described heretofore for the movable belt coupling system.

Among the objects of the invention are to provide an improved method of and means for measuring and indicating the standing wave characteristics of microwaves propagated through a waveguide transmission system. Another object is to provide an improved standing wave detector and indicator system for microwaves propagated through a waveguide transmission system which provides a continuous indication of the magnitudes and distribution of the standing waves. Another object is to provide an improved standing wave detector and indicator for a waveguide transmission system wherein a continuously movable carrier supporting a plurality of wave coupling elements is interposed between coupling apertures in the transmission waveguide and a detector waveguide disposed adjacent thereto. A further object of the invention is to provide an improved standing wave detector for waveguide transmission systems wherein a continuously movable slotted disc is interposed between coupling apertures in the transmission waveguide and in a detector waveguide coupled thereto in a manner whereby the slots in the movable disc successively and continuously traverse and scan the coupling space between the two waveguides. A still further object of the invention is to provide an improved standing wave detector for waveguide transmission systems wherein microwave contact effects are substantially eliminated. Another object is to provide an improved standing wave detector and indicator system for waveguide transmission systems which provides a continuous stationary indication of the wave magnitude and distribution of the standing waves.

The invention will be described in greater detail by reference to the accompanying drawings of which Figure 1 is a perspective, partially schematic, view of a first embodiment of the invention; Figure 2 is a plan, partially schematic, view of said first embodiment of the invention; Figure 3 is a front elevational view of said first embodiment of the invention; Figure 4 is a plan view of the wave detector waveguide portion of said first embodiment of the invention including wave reflection suppressors enclosed therein;
Figure 5 is a cross-sectional, elevational view taken along the section line V—V of Fig. 4; and
Figure 6 is a fragmentary plan view of a second embodiment of the invention. Similar reference characters are applied to similar elements throughout the drawings.

Referring to Figures 1, 2 and 3, a transmission waveguide 1, operating in the $TE_{10}$ mode, includes a longitudinal slot 3 in one of the wide faces 5 thereof, said slot extending along the face of said waveguide for a distance exceeding one-half wavelength in the waveguide at the operating microwave frequency. A detector waveguide 7, having a length of at least one-half wavelength, and having a longitudinal slot 3', is supported adjacent to the transmission waveguide 1, and the slot 3' is juxtaposed with the center portion of the longitudinal slot 3. An insulated carrier belt 11, including sprocket holes 13 adjacent one or both edges thereof, is supported by sprockets 15, 17 in a manner whereby it continuously traverses and scans the space between the detector waveguide 7 and the transmission waveguide 1. The carrier 11 supports a plurality of L shaped wave coupling elements 19 at equi-spaced points thereon in a manner whereby as the support 11 traverses the space between the waveguides 1 and 7, the coupling elements 19 continuously and successively scan the slots 3 and 3' and couple microwave energy from the transmission waveguide 1 to the detector waveguide 7.

The detector waveguide 7, also operating in the $TE_{10}$ mode, is arranged so that its electric axis is parallel to the axis of wave propagation and perpendicular to the electric field in the transmission waveguide 1, as shown by the arrows in the two waveguides. Hence the wave coupling factor to the detector waveguide 7 provided by the moving L shaped elements 19 is uniform throughout the length of the coincidental slots, and no standing waves can occur in the detector waveguide along the direction of the electric field, even though the end walls thereof are conductive. Standing waves do occur in the detector waveguide in the other two directions, and the guide should be so dimensioned as to produce resonance at the operating frequency for maximum sensitivity of the detector. One dimension should be above the cutoff width, about the same width as face 5 of the transmission waveguide 1. The other dimension should then be a multiple of a half wavelength wide (the wavelength being the length in the guide 7). The dimension along the length of the belt can be anything, as long as it is greater than one-half wavelength in the waveguide. It might also be desirable to include means to prevent extraneous modes from being set up in the detector waveguide 7. This can be accomplished by introducing a few wires 45 from top to bottom and front to back as shown in Figures 2 and 3. One of the end faces 33 could be made movable or contain a tuning screw, not shown.

The sprocket 17 is coupled through gears 21, 23 to a continuously rotatable motor 25 which also drives a timing wave generator 27. If desired, any other continuous belt support may be employed which operates a contact device, not shown, for initiating synchronized timing signals. Timing signals derived from the timing generator 27 thus are synchronized with the scanning of the coupling slot 3 and are applied to the horizontal deflecting elements of a cathode ray oscilliscope 29. A wave detector 31, such, for example, as a microwave crystal, is coupled into the detector waveguide 7 on an axis parallel to the electric axis therein, and is responsive to microwave energy coupled thereto by the movable coupling elements 19.

Rectified signals derived from the wave detector 31 are applied to the vertical deflecting elements of the cathode ray oscilloscope 29 to provide a stationary, continuous indication of the standing wave magnitude and distribution in the transmission waveguide 1. The fluorescent screen of the cathode ray oscilloscope 29 preferably may be of the relatively long persistence type to minimize flickering of the standing wave indications. However, the scanning speed may be sufficiently high to obviate the necessity of a long persistence screen. If the microwave signals in the transmission waveguide are amplitude modulated 100 percent, the pattern on the oscilloscope screen will have the standing wave appearing as a modulation on a carrier of the microwave modulating frequency. If the microwave signals are unmodulated, either a D.-C. oscilloscope must be employed to indicate the true magnitude of the standing wave characteristics, or alternate probes on the belt 11 must be omitted to establish a zero signal base line.

The ends 33 of the detector waveguide 7 include slots 35 to permit passage of the coupling elements 19 through the ends of the detector waveguide.

If desired, the supporting belt 11 may be of conductive, or absorbing semi-conducting, material, and the coupling elements 19 may be supported in insulated grommets therein, not shown. The use of a conductive supporting belt would provide better shielding between the transmission waveguide and detector waveguide except in the vicinity of the continuously movable coupling elements. However, if the coupling slot 3 in the transmission waveguide 1 and slot 3' of the detector waveguide 7 are sufficiently narrow, very little coupling will occur between the waveguides except through the movable coupling elements 19.

A relatively highly damped meter 37 may be shunted across the detector output circuit to provide indications of the R. M. S. values of the transmitted microwave energy.

Figures 4 and 5 show a modification of the detector waveguide 7 to minimize the effect of wave reflections therein when the system is operated so that the electrical axes of the two waveguides are parallel (also $TE_{10}$ mode). A pair of tapered wave absorbing elements 39 are disposed within opposite ends of the detector waveguide 7, with their tapered surfaces facing into the waveguide. The underside of both of the wave absorbing elements 39 is slotted to permit passage therethrough of the movable coupling elements 19 carried by the continuously moving support 11. The wave absorbing elements 39 may comprise, for example, plugs of Bakelite or other insulating material having a relatively high percentage of metallic, carbon, or other conductive material.

The wave detector 31 may be located at any desired point in the detector waveguide 7 in the space between the wave absorbing elements 39, and should be coupled to the waveguide on an axis parallel to the electrical axes of both waveguides. The coupling rod in this case should not be L-shaped, as in the system of Figs. 1 to 3, but is a straight rod extending into both waveguides parallel to their electric axes. It should be emphasized that substantially all wave reflections should be suppressed in the detector waveguide 7 in order to prevent spurious indications of the standing wave magnitudes and distribution in the transmission wave guide 1. Since there are no extraneous modes in this detector, no wires need be stretched across it. Also, since it is non-resonant, it need not be tuned.

Figure 6 illustrates a second embodiment of the invention which may be substituted for the continuously movable belt 11 and coupling elements 19 of the system described heretofore. The transmission waveguide 1 is separated from the detector waveguide 7 by a continuously rotatable conducting or semi-conducting disc 41 which includes a plurality of equi-spaced radial slots 43. Rotation of the disc 41 causes the coupling slots 43 continuously and successively to scan similar coincidental coupling slots in the adjacent faces of the transmission waveguide 1 and the detector waveguide 7, whereby standing waves in the transmission waveguide are continuously scanned and coupled into the detector waveguide. The wave detector 31 may be coupled to a cathode ray oscilloscope in the same manner as described heretofore in the device described by reference to Figs. 1 to 3, and the indicator may be synchronized with the rotation of the disc 41 by driving the timing generator from the same motor.

The sensitivity of the device described by reference to Figure 6 may be less than that of the device described by reference to Figures 1 to 3, since the only coupling between the transmission waveguide and detector waveguide must occur through the coupling apertures 43. In general the longitudinal slots 3 and 3' of the device of Figure 6 should be wider than would be required for the device described by reference to Figs. 1 to 3. This rotating disc embodiment of the invention will function only with the waveguide detector system of Figs. 4 and 5.

Thus the invention disclosed comprises improved methods of and means for detecting and indicating the magnitudes and distribution of standing waves in a waveguide transmission system, wherein continuously movable coupling elements interposed between the transmission waveguide and a detector waveguide continuously and successively scan the standing waves in the transmission waveguide to provide continuous oscillographic indications of said standing waves. Microwave contact effects are substantially eliminated since no moving contacts are required for the movable wave probe elements.

I claim as my invention:

1. A system for measuring standing wave characteristics in a waveguide transmission line comprising, in combination, a coupling waveguide disposed adjacent to and adapted to be coupled over a distance of at least one half wavelength to said line, a wave measuring device coupled into said coupling waveguide, and a movable wave coupling device interposed between said waveguide section and said waveguide transmission line and movable with respect to both said section and said line for providing selective wave coupling to said measuring device at progressive points along said transmission line.

2. A system according to claim 1 including means for moving said coupling device longitudinally between said line and said coupling waveguide, and wherein said measuring device comprises an oscillographic device synchronized with the movement of said coupling device for providing a visual indication of the standing wave characteristics of said transmission line.

3. A system for measuring standing wave characteristics in a waveguide transmission line comprising, in combination, a longitudinally slotted section of said line, a complementarily slotted coupling waveguide disposed adjacent to and having its slot aligned with the slot of said section, a wave measuring device coupled into said coupling waveguide, and a movable wave coupling device interposed between said waveguide section and said coupling waveguide for providing selective wave coupling to said measuring device at progressive points along said aligned slots.

4. A system for measuring standing wave characteristics in a waveguide transmission line comprising, in combination, a longitudinally slotted section of said line, a complementarily slotted coupling waveguide disposed adjacent to and having its slot aligned with the slot of said section, a wave detecting device coupled into said coupling waveguide, a wave measuring device coupled to said detecting device, and a longitudinally movable wave coupling device interposed between said waveguide sections and said coupling waveguide for providing selective wave coupling to said measuring device at progressive points along said aligned slots.

5. A system for measuring standing wave characteristics in a waveguide transmission line comprising, in combination, a longitudinally slotted section of said line, a complementarily slotted coupling waveguide disposed adjacent to and having its slot aligned with the slot of said section, a wave measuring device coupled into said coupling waveguide, and a continuously movable wave coupling device interposed between said waveguide section and said coupling waveguide for providing selective wave coupling to said measuring device at progressive points along said aligned slots.

6. A system for measuring standing wave characteristics in a waveguide transmission line comprising, in combination, a longitudinally slotted section of said line, a complementarily slotted coupling waveguide disposed adjacent to and having its slot aligned with the slot of said section, means for suppressing standing waves within said coupling waveguide, a wave measuring device coupled into said coupling waveguide, and a longitudinally movable wave coupling device interposed between said waveguide section and said coupling waveguide for providing selective wave coupling to said measuring device at progressive points along said aligned slots.

7. A system for measuring standing wave characteristics in a waveguide transmission line comprising, in combination, a longitudinally slotted section of said line, a complementarily slotted coupling waveguide disposed adjacent to and having its slot aligned with the slot of said section, a wave measuring device coupled into said coupling waveguide, and a longitudinally movable carrier supporting a plurality of wave coupling devices interposed between said waveguide section and said coupling waveguide for providing selective wave coupling to said measuring device at progressive points along said aligned slots.

8. A system for measuring standing wave characteristics in a waveguide transmission line comprising, in combination, a longitudinally slotted section of said line, a complementarily slotted coupling waveguide disposed adjacent to and having its slot aligned with the slot of said section, a wave measuring device coupled into said coupling waveguide, and a movable apertured shutter wave coupling device interposed between said waveguide section and said coupling waveguide for providing selective wave coupling to said measuring device at progressive points along said aligned slots.

9. A system for measuring standing wave characteristics in a waveguide transmission line comprising, in combination, a longitudinally slotted section of said line, a complementarily slotted coupling waveguide disposed adjacent to and having its slot aligned with the slot of said section, means for suppressing standing waves within said coupling waveguide, a wave detecting device coupled into said coupling waveguide, a wave measuring device coupled to said detecting device, and a movable wave coupling device interposed between said waveguide section and said coupling waveguide for providing selective wave coupling to said measuring device at progressive points along said aligned slots.

10. A system according to claim 9 including means for moving said coupling device longitudinally between said line and said coupling waveguide, and wherein said wave measuring device comprises an oscillographic device synchronized with the movement of said coupling device for providing a visual indication of the standing wave characteristics of said transmission line.

11. A system for measuring standing wave characteristics in a waveguide transmission line comprising, in combination, a longitudinally slotted section of said line, a complementarily slotted coupling waveguide disposed adjacent to and having its slot aligned with the slot of said section, a wave measuring device including a cathode ray oscillograph coupled into said coupling waveguide, a movable wave coupling device interposed between said waveguide section and said coupling waveguide for providing selective wave coupling to said measuring device at progressive points along said aligned slots for controlling the deflection of said oscillograph along one of its coordinates, means for actuating said wave coupling means to scan said aligned slots, and means synchronized with said actuating means for controlling the deflection of said oscillograph along another of its coordinates for providing visual indications of the standing wave characteristics of said transmission waveguide.

DANIEL BLITZ.

REFERENCES CITED

The following references are of record in the file of this patent:

UNITED STATES PATENTS

| Number | Name | Date |
|---|---|---|
| 2,191,271 | Carter | Feb. 20, 1940 |
| 2,400,597 | Peterson | May 21, 1946 |
| 2,403,289 | Korman | July 2, 1946 |
| 2,418,484 | Samuel | Apr. 8, 1947 |
| 2,419,208 | Frantz | Apr. 22, 1947 |
| 2,423,390 | Korman | July 1, 1947 |
| 2,432,100 | Kircher | Dec. 9, 1947 |